(12) United States Patent
Jarrett, Jr.

(10) Patent No.: US 8,224,499 B1
(45) Date of Patent: Jul. 17, 2012

(54) REMOTE ANNUNCIATOR

(75) Inventor: Harold M. Jarrett, Jr., Jefferson, GA (US)

(73) Assignee: Omnimetrix, LLC, Buford, GA (US)

( * ) Notice: Subject to any disclaimer, the term of this patent is extended or adjusted under 35 U.S.C. 154(b) by 0 days.

(21) Appl. No.: 11/120,779

(22) Filed: May 3, 2005

(51) Int. Cl.
*G05B 11/00* (2006.01)
(52) U.S. Cl. .................................... 701/1; 73/112.01
(58) Field of Classification Search ............... 701/1, 29, 701/101, 102, 114, 115, 35, 29.1, 29.2, 29.9, 701/31.4, 31.5, 31.7, 31.9; 73/112.01, 118.01, 73/118.02, 156, 116, 117.3, 117.2, 118.1
See application file for complete search history.

(56) References Cited

U.S. PATENT DOCUMENTS

| | | | | |
|---|---|---|---|---|
| 4,912,382 A | * | 3/1990 | Koenig et al. | 318/563 |
| 6,112,150 A | * | 8/2000 | Irons et al. | 701/114 |
| 6,631,310 B1 | * | 10/2003 | Leslie | 700/292 |
| 6,947,975 B2 | * | 9/2005 | Wong et al. | 709/217 |
| 6,998,956 B2 | * | 2/2006 | Dix | 340/5.2 |
| 6,999,869 B1 | * | 2/2006 | Gitlin et al. | 701/115 |
| 2004/0167689 A1 | * | 8/2004 | Bromley et al. | 701/29 |

* cited by examiner

Primary Examiner — Dalena Tran
(74) Attorney, Agent, or Firm — Kenneth W. Float

(57) ABSTRACT

Apparatus and methods or algorithms that report data regarding an engine controller and allow control over an engine coupled to the engine controller. The controller is coupled to a remotely-located annunciator. The annunciator has an engine communication interface for communicating with the controller, a display, interface electronics for causing the display to indicate status reported by the engine controller a network interface, and a computer processor coupled to the interface electronics, the engine communication interface and the network interface. The controller is polled to monitor engine parameters and the status. The engine parameters and status are transmitted to a remote web-accessible database by way of the network interface. A remote monitoring and control system comprising the remote database is able to monitor the operation of multiple generators through their engine controllers and control individual generators by way of remote annunciators. The combination of the remote annunciators and the remote monitoring and control system allows remote control operation of the engines.

20 Claims, 5 Drawing Sheets

REMOTE ANNUNCIATOR

BACKGROUND

The present invention relates generally to power generation systems, engines, engine controllers, and methods, and more particularly, to remote annunciators and related methods for monitoring engine controllers, and the like.

Many businesses have backup or standby power generation systems to back up power for the businesses in the event of power blackout conditions. Such standby power generation systems comprise a power generator which is coupled to an engine controller, and which is commonly known as a GENSET. Also many buildings are required to have pumps to be able to drive adequate flow to upper floors for fire prevention reasons. Many of them use diesel engines, and they, too, have remote annunciators.

The engine controller may be hard wired to a remote annunciator, which is used to alert a user regarding the condition of the GENSET or to the fact that a problem has occurred with the operation of the power generator or engine controller. The engine controller outputs alarm signals to the remote annunciator, which activates an indicator on a display panel and sounds an alert horn, for example. The conventional remote annunciator is, in essence, a dumb display, which only responds to the alarm signals to provide user alerts.

Some engine controller manufacturers have provided network connections to their engine controllers, allowing access to engine data. Such a design calls for an external computer with dedicated data acquisition software connecting to the controller. While this is reasonable for diagnostic use, it is not appropriate for accessing large numbers of remote GENSETs scattered around the world. It is relatively easy to make such a connection if the computer can be placed on the same subnet as the engine controller, but becomes more complicated otherwise. It becomes extremely difficult to make the connection from the computer to the GENSET if the computer is Internet-connected, outside the firewall protection of the customer LAN. In fact, firewall devices are designed to prevent the very connections that such design requires.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
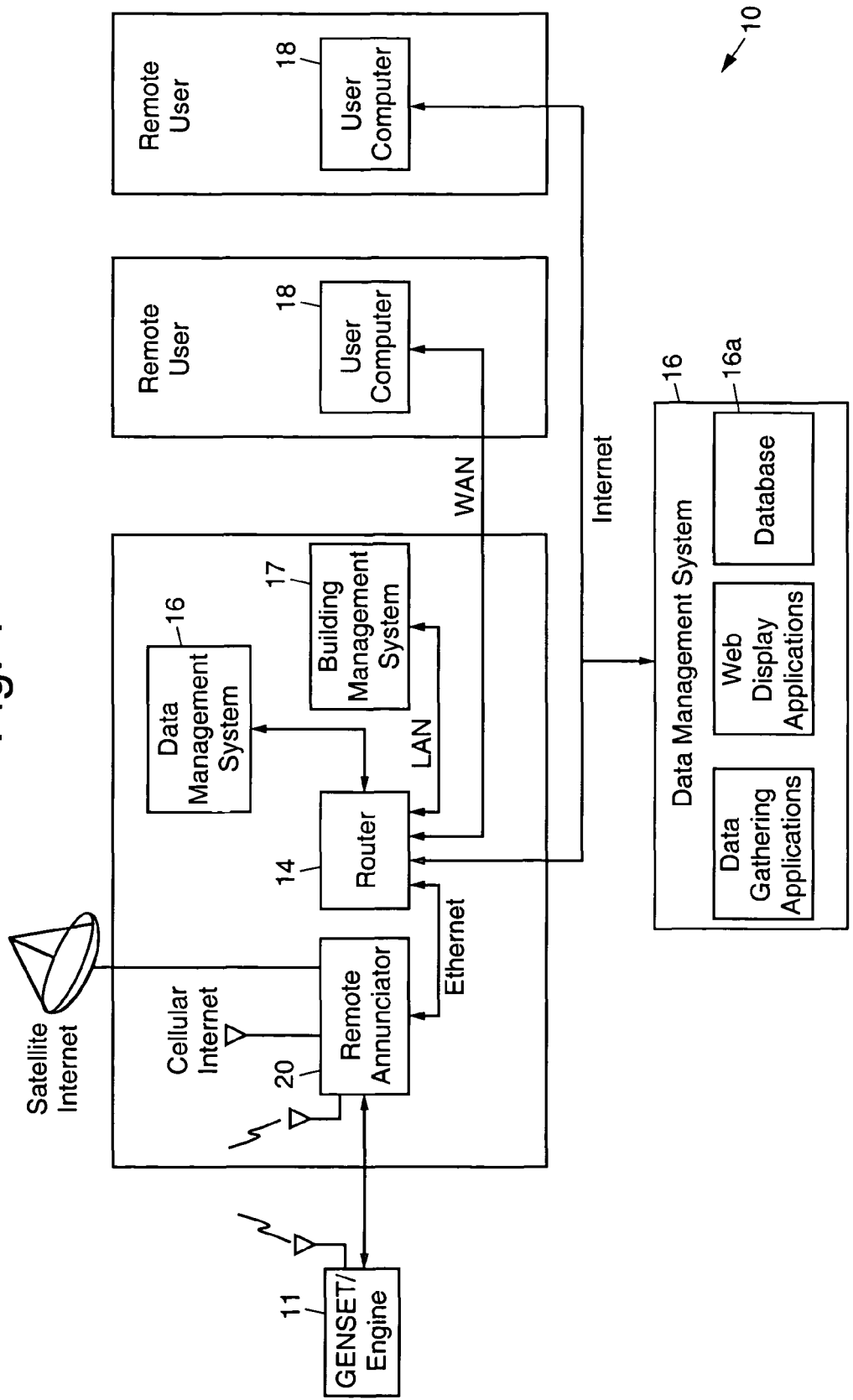
FIG. 1 illustrates an exemplary power generating system employing a remote annunciator in accordance with the principles of the present invention.

Referring to the drawing figures, FIG. 1 illustrates an exemplary power generating system 10 employing a remote annunciator 20 in accordance with the principles of the present invention. The remote annunciator 20 is used to interface with one or more remotely-located power generators with engine controllers, referred to as GENSETs 11. Alternatively, the GENSET 11 may be an engine 11, such as may be employed in a pump system having an engine controller.

Figure 2:
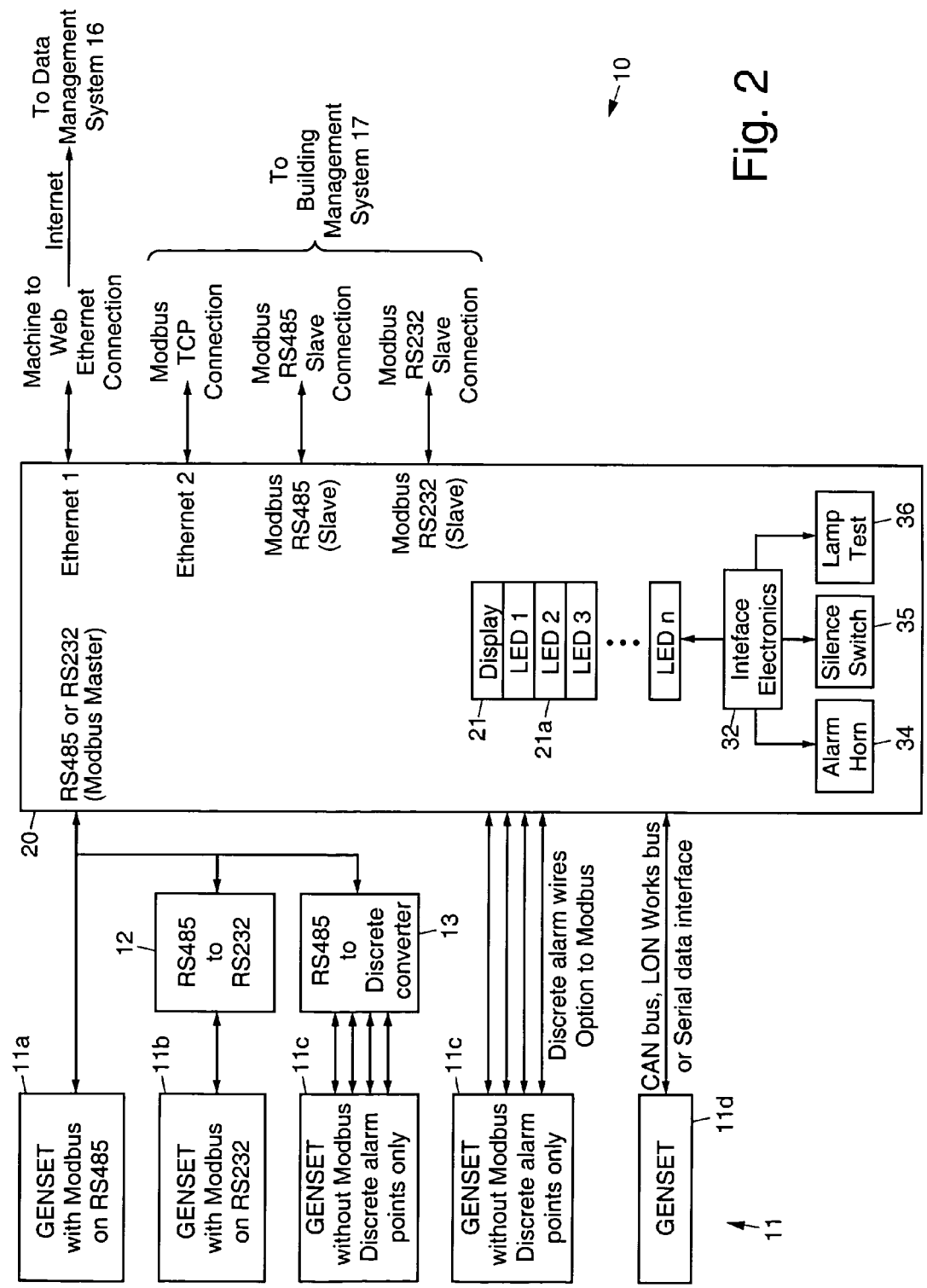
FIG. 2 illustrates details of the exemplary power generating system and remote annunciator shown in FIG. 1.

The GENSET 11 is coupled to the remote annunciator 20 via one of several connection techniques which are illustrated in FIG. 2. The connection techniques include discrete wiring 29, a Modbus over RS232 port 24, a Modbus over RS485 port 23, or using other serial data transport protocols such as a controller area network (CAN) bus. The connection may also be made through a wireless link, such as a secure spread spectrum data link (shown in FIG. 4).

The remote annunciator 20 is coupled by way of an Ethernet connection to a router 14. The router 14 may be coupled to a local data management system 16. The router 14 may be coupled by way of a local area network (LAN) to a building management system 17. The building management system 17 allows a user to monitor and control the GENSET 11. The router 14 may be coupled by way of a wide area network (WAN) to one or more remotely-located user computers 18. The router 14 may be coupled by way of the Internet to one or more remotely-located user computers 18. The router 14 is coupled by way of the Internet to a remotely located data management system 16. Internet connectivity may also be implemented using a cellular Internet connection or a satellite Internet connection, in lieu of the Ethernet connection.

The remote annunciator 20 is designed to deliver the operational data that it receives from the GENSET 11 to users. This is achieved by pushing that data into a remote database 16a of the data management system 16 that provides web browser access to the data. Thus, users may access the data across the LAN, WAN, or the Internet. The remote database 16a may be located within a user's facility, or may be remotely located with access provided by Internet or WAN connectivity.

The data management system 16 includes data gathering applications which are designed to receive the encrypted packets from the remote annunciator 20, and store them in the database 16a. The database 16a may be local to the data gathering applications, or at a remote Internet-connected location. The data management system 16 also provides a web service application that allows web access to the data, via a simple browser program. The database 16a is typically a SQL database that is capable of redundancy and replication, so as to provide a safe method of backup.

In contrast to conventional implementations, the remote annunciator 20 is responsible for making and maintaining the network connection to the remote data management system 16. Because the socket connection is initiated from the user side of any firewall, the connection is typically allowed automatically with no special settings applied to the firewall. Upon connecting to the remote data management system 16, the remote annunciator 20 identifies itself to the data management system 16, and the data management system 16 allows the connection and subsequent data transfer. Should the connection be dropped for any reason, the remote annunciator 20 automatically reconnects and re-establishes the data transport connection with the data management system 16. This design essentially removes the necessity for on-site network engineering, resulting in savings of time and money during installation.

The remote annunciator 20 operates in either a server-assigned (DHCP) IP addressing or static IP addressed mode. The DHCP method allows simple plug and play installation, while assignment of a static IP address to the remote annunciator 20 requires a few minutes of set up on site. No conventional remote annunciator is implemented in this manner.

FIG. 2 illustrates details of the exemplary power generating system 10 and remote annunciator 20 shown in FIG. 1. The remote annunciator 20 is used to interface with one or more remotely-located power generators with engine controllers, referred to as GENSETs 11.

The remotely-located power generators and engine controllers, or GENSETs 11, are typically located a distance up to 10,000 feet away from the remote annunciator 20. The basic purpose of the remote annunciator 20 is to alert an operator or user of a GENSET 11 that a problem has occurred with its operation.

Different types of GENSETs 11 are currently deployed. For example, a first type of GENSET 11a comprises a power generator and controller having an RS485 interface that communicates using a Modbus protocol. A second type of GENSET 11b comprises a power generator and controller having an RS232 interface that communicates using a Modbus protocol. A third type of GENSET 11c comprises a power generator and controller without a Modbus interface that communicates over discrete alarm wires. A fourth type of GENSET 11d comprises a power generator and controller using CAN bus, LON Works, or other alternative serial data interfaces. All of these GENSETs 11 and their operation are well-known to and well-understood by those skilled in the art.

"RS232" refers to a serial data transfer protocol that that is an Electronics Industry Alliance (EIA) standard for connecting serial devices, and is commonly used for simple point-to-point communication. "RS485" refers to a serial data transfer protocol that is an EIA standard for multipoint communications.

The first type of GENSET 11a may use an engine controller such as a model DEC 550 engine controller manufactured by Kohler or a model EMCP3 engine controller manufactured by Caterpillar, for example. The second type of GENSET 11b may use a model "E" panel or "F" panel engine controller manufactured by Generac, for example. The third type of GENSET 11c include older GENSETs 11 manufactured by substantially all generator manufacturers.

The second type of GENSET 11b may be coupled to the Internet-connected remote annunciator 20 by way of an RS485 to RS232 converter 12, for example, or via the RS232 port of the remote annunciator 20. The third type of GENSET 11c may be coupled to the Internet-connected remote annunciator 20 by way of an RS485 to discrete converter 13, for example. Such discrete input-to-Modbus converters are generally available, such as those referred to as ADAM modules, built by Advantech. Alternative wireless connections between the GENSETs 11 and the remote annunciator 20 may be provided, which will be discussed with reference to FIG. 4.

The various GENSETs 11 are connected to the remote annunciator 20 using the appropriate protocol for the particular GENSET 11 as illustrated in FIG. 2. The remote annunciator 20 provides interfaces to each GENSET 11, such as by way of the RS485 or RS232 interface (Modbus master), for example. In the alternative embodiment shown in FIG. 4, the remote annunciator 20 interfaces to the GENSETs 11 by way of an RS232 interface. The remote annunciator 20 polls the engine controller and responds to condition signals transmitted from the engine controllers and lights one or more indicators 21a (such as LEDs 21a) on a display panel 21 and also typically sounds an alarm horn 34 to alert the user of the alarm condition, as may be required.

The remote annunciator 20 also includes various interfaces that provide for Internet and network connectivity. These interfaces include a machine to web Ethernet connection (Ethernet 1), a ModbusTCP connection (Ethernet 2), a Modbus RS485 slave connection (Modbus RS485 slave), and a Modbus RS232 slave connection (Modbus RS232 slave).

Figure 3:
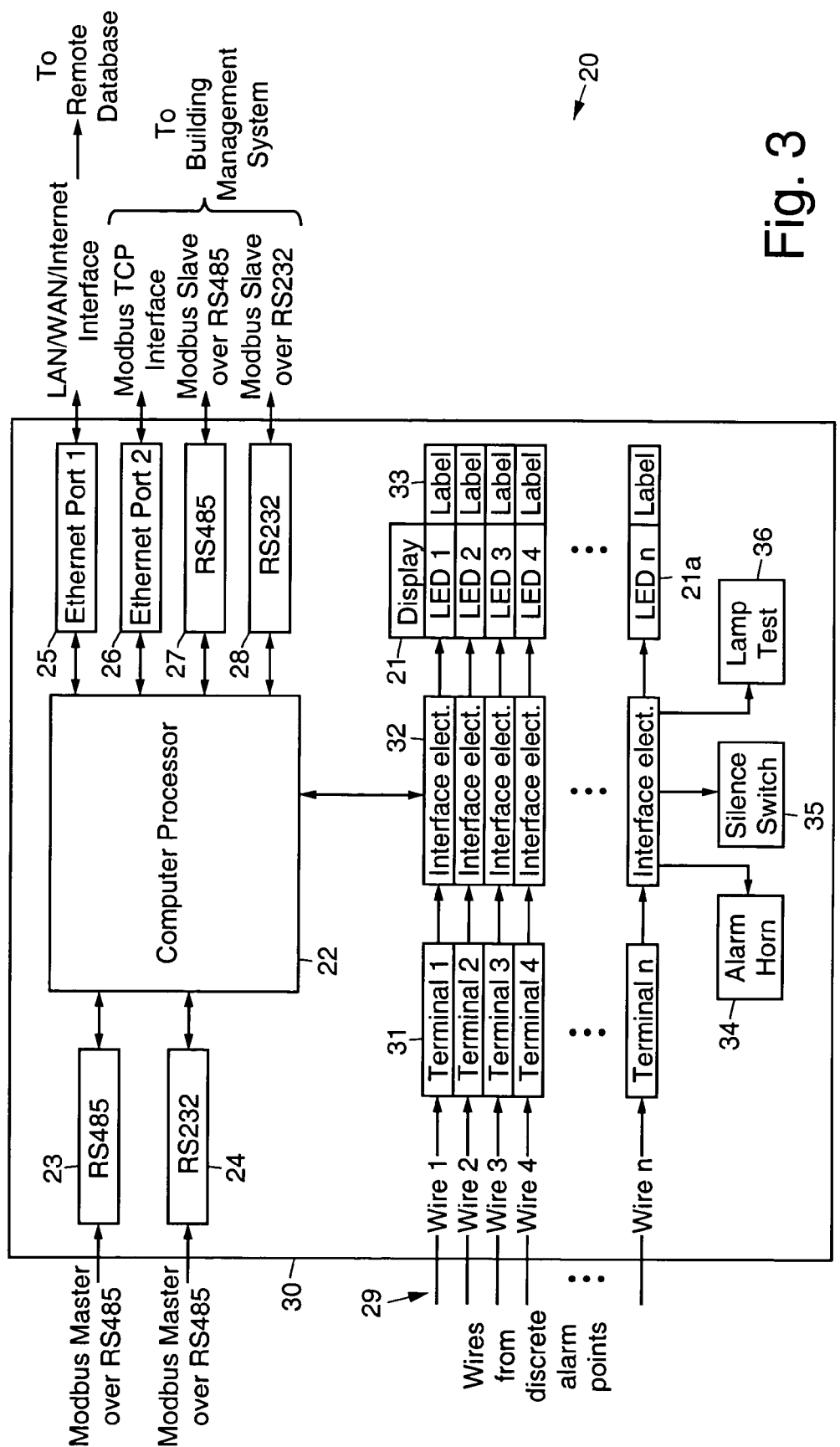
FIG. 3 illustrates details of the remote annunciator shown in FIG. 2.

Referring to FIG. 3, it illustrates details of the exemplary Internet-connected remote annunciator 20 shown in FIG. 2. The remote annunciator 20 comprises a plurality of interface and display circuits, including microcircuits and/or integrated circuits, that may be disposed on a printed circuit board 30. It is to be understood that, although most of the integrated circuit components of the Internet-connected remote annunciator 20 are shown as discrete circuits in FIG. 3, these individual microcircuits may be integrated into a single circuit, such as within a computer processor 22, for example. Thus, it is the functions of the various interfaces that are provided that are important, and not the specific physical form of the implementation that is important.

The remote annunciator 20 comprises a master RS485 interface 23 and a master RS232 interface 24. The RS485 interface 23 may be implemented using an integrated circuit such as model ADM 1487AR RS485 interface, manufactured by Analog Devices, for example. The RS232 interface 24 may be implemented using an integrated circuit such as model ADM 202 RS232 interface, manufactured by Analog Devices, for example. The RS485 interface 23 implements a Modbus master communication protocol over an RS485 link. The RS232 interface 24 implements a Modbus master communication protocol over an RS232 link.

In the example embodiment of the remote annunciator 20 shown in FIG. 3, the input RS485 and RS232 interfaces 23, 24 are coupled to a computer processor 22, or microcontroller 22. An exemplary computer processor 22 is a model 18F452 processor, manufactured by Microchip, for example.

The remote annunciator 20 comprises first and second Ethernet interfaces 25, 26, or ports 25, 26. Exemplary Ethernet interfaces 25, 26 may be Xport Ethernet interfaces manufactured by Lantronix, for example. The computer processor 22 is coupled to the first and second Ethernet interfaces 25, 26, or ports 25, 26.

The remote annunciator 20 also comprises an RS485 Modbus slave interface 27 and an RS232 Modbus slave interface 28. The RS485 Modbus slave interface 27 may be a model ADM 1487AR RS485 interface, for example. The RS232 Modbus slave interface 28 may be a model ADM 202 RS232 interface, for example. The computer processor 22 is coupled to the RS485 and RS232 Modbus slave interfaces 27, 28

The computer processor 22 is coupled to interface electronics 32 that are used to couple status and alarm signals received from the GENSET 11 by way of the input RS485 and RS232 interfaces 23, 24 to the indicators 21a on the display panel 21. The interface electronics 32 may be well-known port expanders, such as model PCA 9554A, port expanders manufactured by Philips, for example, or may be driven directly by the processor 22.

The computer processor 22 may communicate with the interface electronics 32 by way of a serial bus, for example, such as an I2C (Inter-IC) multi-master bus designed by Philips Semiconductor, which is used to connect integrated circuits, or by way of a serial peripheral interface (SPI), which is a full-duplex synchronous serial interface for connecting low-medium-bandwidth external devices using four wires, for example.

The interface electronics 32 are coupled to a silence switch 35 that allows a user to turn off the alarm horn 34. The interface electronics 32 may be also coupled to terminals 31 that connect to the discrete alarm wires that are coupled to the third type of GENSET 11c (having no Modbus interface). The interface electronics 32 route the alarm signals to the indicators 21a (LEDs 21a) and/or to the computer processor 22. The interface electronics 32 are coupled to a lamp test switch 36 that permits testing of the indicators 21a (LEDs 21a).

The remote annunciator 20 provides a means for displaying alerts to the user as well as a means for monitoring data output by the engine controller of the GENSET 11 and transmitting (pushing) it to a remote database 16a. This eliminates the need for a separate monitoring device directly coupled to the engine controller. Transmission of the data to the remote database 16a may be achieved using an Internet connection, such as one of the Ethernet interfaces 25, 26, for example, which may include wired or wireless communication links.

The data that is transmitted (pushed) it to the remote database 16a includes engine data, which is processed to make it web-accessible so that technical service personnel can access the data to evaluate the performance of their installed power generators and engine controllers. The remote annunciator 20 in conjunction with the remote database 16a provide global remote access to real-time engine data via a desktop web browser. This interface provides both automatic reporting of engine data or polled access to specific values. Evaluation of the data presented in the database 16a may be used for predictive failure avoidance solutions based on trend analysis of key machine parameters.

Figure 4:
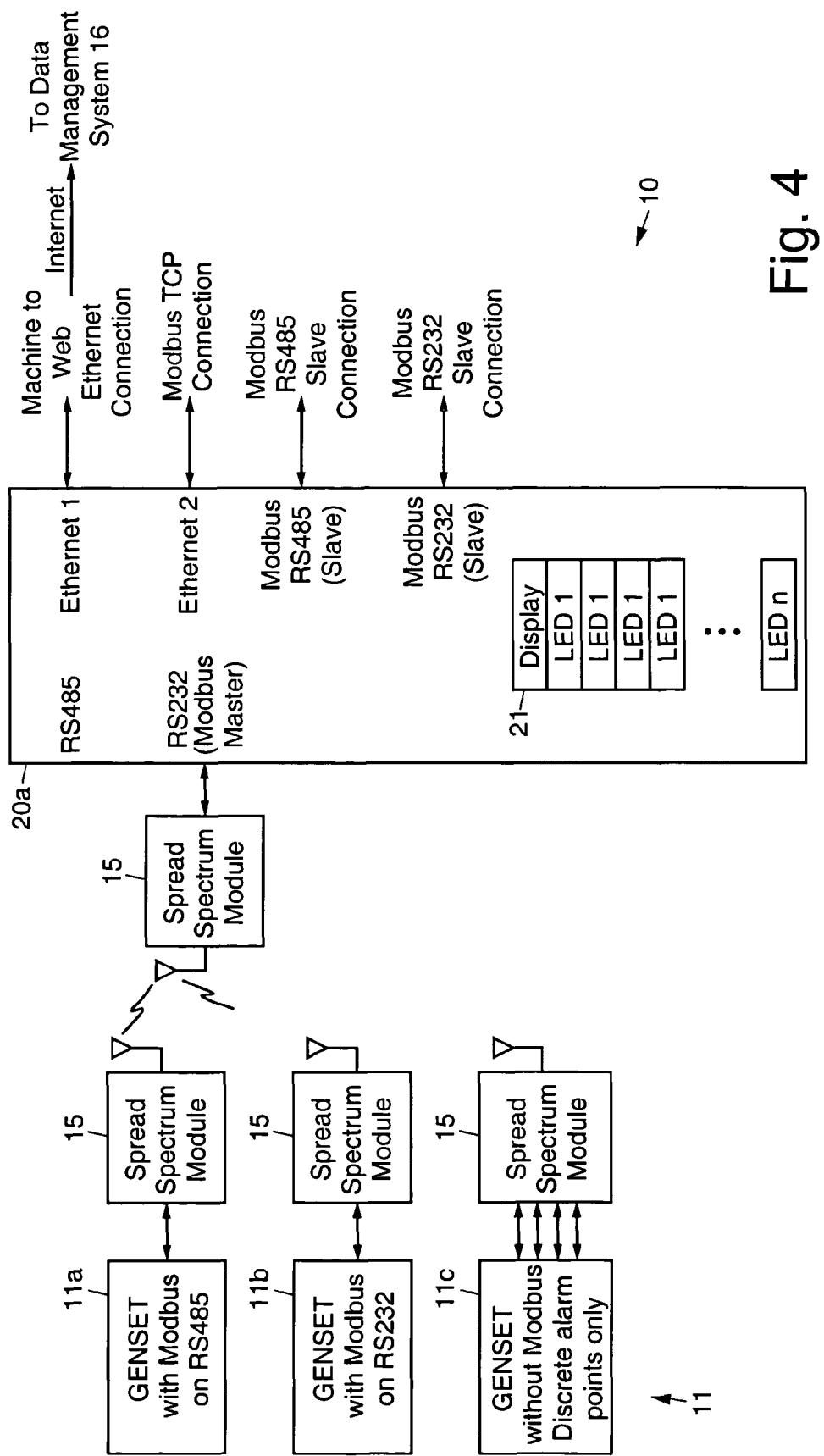
FIG. 4 shows an alternative embodiment of the remote annunciator.

FIG. 4 shows a power generating system 10 employing an alternative embodiment of the remote annunciator 20a. In this embodiment, the remote annunciator 20a is coupled to the GENSETs 11 using the RS232 Modbus master interface 24. In this embodiment, each of the GENSETs 11 that communicate with the remote annunciator 20 is coupled to a spread spectrum radio module 15, and the RS232 Modbus master interface 24 is also coupled to a spread spectrum radio module 15. The spread spectrum radio modules 15 may be a model Connexlink, manufactured by Aerocomm, for example. The respective spread spectrum radio modules 15 communicate with each other to transmit signals between the respective GENSETs 11 and the Internet-connected remote annunciator 20a.

Figure 5:
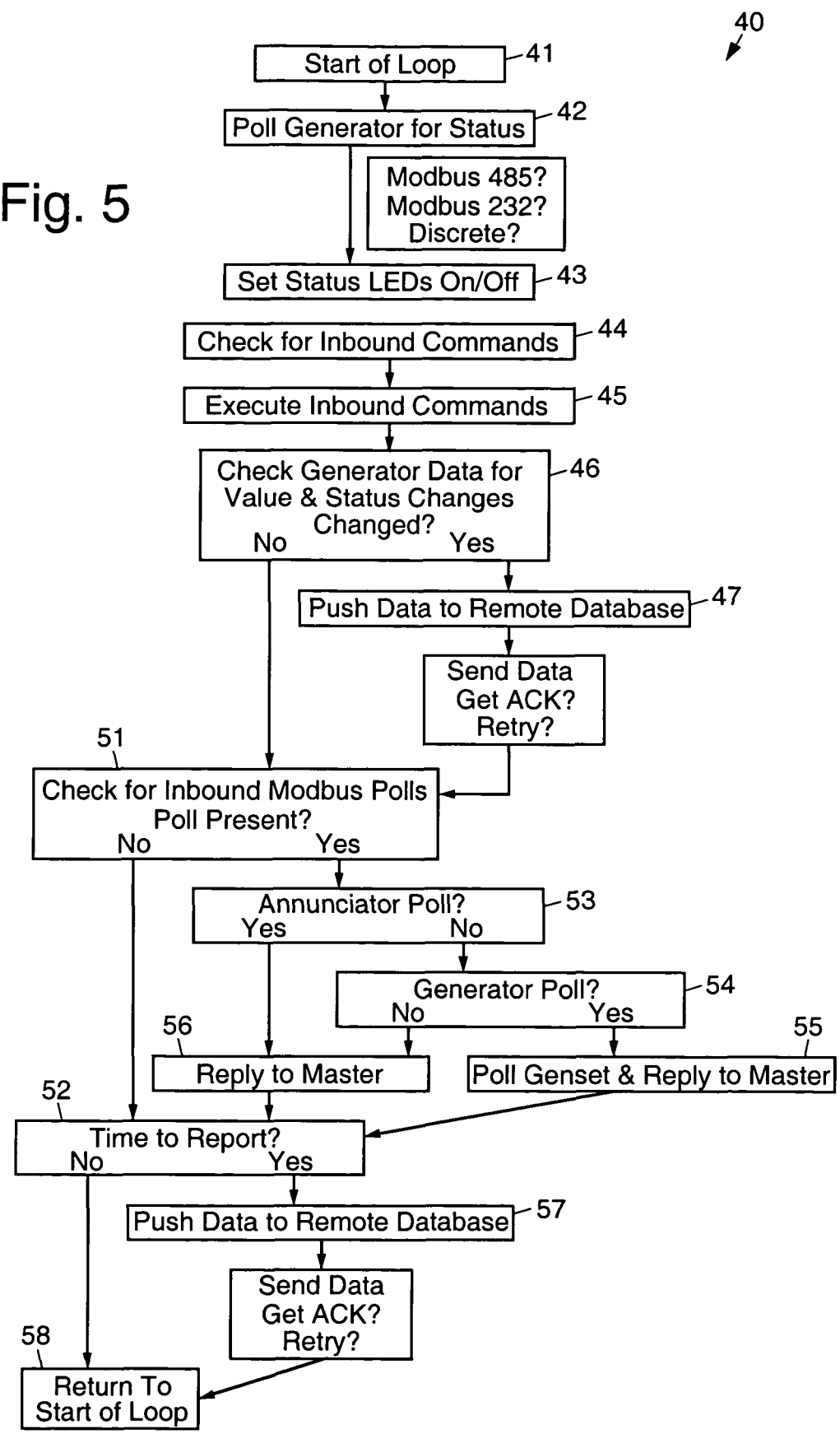
FIG. 5 is a flow diagram that illustrates an exemplary method or algorithm in accordance with the principles of the present invention.

FIG. 5 is a flow diagram that illustrates an exemplary method 40 in accordance with the principles of the present invention. The exemplary method 40 is operative to poll a GENSET 11, display alarm signals that are generated by the GENSET 11, and transmit polled data to a remote database 16a where it is made web accessible to technical service personnel. The method 40 may be implemented as an algorithm 40 implemented in the processor 22.

With regard to the specifics of the method 40 or algorithm 40, at a start of a polling loop 41, the GENSETs 11 coupled to the Internet-connected remote annunciator 20 are polled 42 regarding their status. Based upon settings of the remote annunciator 20, the processor 22 will obtain engine status data via one of the Modbus master interfaces 23, 24, or via the discrete wire interface 29. The indicators 21a (LEDs 21a) on the display panel 21 are set 43 (on or off) in response to the received signals.

The processor 22 checks 44 the Ethernet 1 port 25 to determine the presence of any inbound commands from the remote data management system 16. Inbound packets are typically held at the Ethernet interface through flow control signals. If inbound packets are present, the processor 22 responds to the commands or data requests contained in the inbound packet, and executes 45 the command.

The data communicated by the GENSET 11 in the packet also includes commands relating to operation of the GENSET 11. The data communicated by the GENSET 11 is checked 46 to determine whether values or status have changed.

If the values or status have not changed (NO), the processor 22 then moves on to check 51 for inbound Modbus polls, through the Modbus slave ports 26, 27, and 28. If the generator values have changed (YES) in the change test 44 (i.e., the inbound command check 44), then the new condition, and optionally an array of generator information is sent 47 to the remote database 16a. Upon transmitting the packets of data to the remote database 16a, the processor 22 checks for an acknowledgement from the remote database 16a, indicating that the packet was received in good condition. If the acknowledgement is not received, the processor 22 will send the packet again until successful acknowledgement is received.

The processor 22 checks the Modbus slave ports, 26, 27, 28 for inbound polls 51 from a Modbus master, such as the building management system 17. If a poll is present, the processor decodes the poll to determine if it is for annunciator data 53 or for generator data 54. If the poll is for annunciator data 53, the processor 22 responds with the appropriate data to the master with a Modbus response via the same port on which the poll was received. If the poll is for generator data 54, the processor 22 responds to the master with the appropriate generator data. If the generator interface is via discrete wiring 29, the processor 22 may respond to the poll with status information available within the remote annunciator. If the generator is connected to the remote annunciator via one of the Modbus master ports 23, 24, the processor 22 creates a Modbus poll 55 to the GENSET 11 via the master ports 23, 24, and listens for the response from the GENSET 11. Upon receipt of the GENSET data, the processor 22 responds 55 to the original inbound poll via the Modbus slave ports with the requested data.

In real-time remote monitoring applications, data is pushed to the remote database 16a on a regular time-based interval in order to provide an ever-present remote view into the operation of the remote equipment. This interval might range from a few seconds to hours, depending on the needs of the user. A determination 52 is made if it is time to report to the remote database 16a. If it is not time to report to the remote database 16a, a return 58 to the start of loop 41 is made.

If it is time to report to the remote database 16a, then the array of operational data is transmitted 57 (pushed) to a remote database 16a. During transmission, a data packet is sent to the remote database 16a which returns an acknowledgement (ACK). If the acknowledgement is received, the process moves on to return 58 to the top of the primary loop 41. If the acknowledgement is not received, the data is resent to the remote database 16a until a acknowledgement (ACK) is received. The method then returns 58 to the start of the loop 41.

The result of testing the GENSET for condition and delivering the data to the remote database 16a is that all of the operational data is made available to remote users via a simple web browser interface. This allows equipment owners to confirm the operation of their equipment, service organizations to detect operational alarms and to respond quickly before catastrophic failures occur, and factory engineers to analyze the operational reliability of fielded equipment. The benefit and unique design of the current invention is based on the fact that remote annunciators are commonly required for locations involving health and safety. By combining local display (traditional annunciator function) with remote database and data management connectivity, all of the operational data available from the GENSET may be archived throughout the life of the GENSET, with no additional cost to the owner. This improves on the prior art in which a separate monitoring system was required in order to achieve the connectivity now provided by the internet-connected remote annunciator.

Conventional remote annunciators have utilized discrete wire connection and serial data alarm transfer, but these annunciators are for local display only. The present invention is fundamentally different from the prior art as a result of the network connection to the external database 16a and web display process, allowing users to access the current and historical operational data from the engine controller. Further, the present invention is capable of displaying its alarm conditions not just to the local indicators, but to an unlimited number of computer screen displays as a result of its network connectivity. While conventional remote annunciators provided blinking LEDs and sonic alarms in a single physical location, mounted to a wall in a hallway, for example, the present invention can equally well display alarms on computer screens around the world instantly and simultaneously.

Further, as a result of the Internet connectivity that is a fundamental aspect of the present invention, remote users may initiate operation of the generators located in distributed geographic locations. This remote control operation is particularly valuable in utility power programs, where distributed generation is called upon to reduce demand on distribution and transmission systems. Example programs are sometimes referred to as "Demand Response" programs. The present invention uniquely enables connectivity of generators to a common, external remote monitoring and control process, or system, comprising the remote database 16a, allowing those generators to become part of a large scale, utility demand driven power production program.

In this aspect of the present invention, a plurality of power generating systems 10 are coupled to the remote monitoring and control system comprising the remote database 16a by way of a plurality of remote annunciators 20. The remote monitoring and control system comprising the remote database 16a monitors the operation of the generators and controls individual generators by way of the remote annunciators 20. The combination of the remote annunciators 20 and the remote monitoring and control system allows remote control operation of the generators.

While the present invention has been disclosed with reference to power generators, it also has application for use with fire pumps that use engines coupled to engine controllers. As was mentioned in the Background section, many buildings are required to have pumps to be able to drive adequate flow to upper floors for fire prevention reasons. Many of them use diesel engines, and they, too, have remote annunciators.

In accordance with the present invention, a remote annunciator 20 replaces a conventional annunciator and interfaces with the engine controller as discussed above in order to monitor and/or control the engine of the fire pump. The drawings figures indicate that either a GENSET 11 or engine may be coupled to the remote annunciator 20. The balance of the system and processing relating to interfacing the engine controller of the fire pump to the remote annunciator 20 is substantially as described above.

Thus, remote annunciators and related methods or algorithms for monitoring power generating systems have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Apparatus for use with a stationary engine and engine controller coupled thereto, comprising:

a remote annunciator that is remotely located from the stationary engine, and that is disposed in a facility near the stationary engine, comprising:
a display including one or more audible and visual engine status indicators;
interface electronics for causing the display to indicate status reported by the engine controller;
an engine communication interface for communicating with the engine controller;
an Internet connection; and
a computer processor coupled to the interface electronics, the engine communication interface and the Internet connection, for polling the engine controller to monitor engine parameters and conditions reported by the engine controller, and for automatically reporting engine parameters by transmitting the engine parameters and conditions to a remote database by way of the Internet connection.

2. The apparatus recited in claim 1 wherein the engine communication interface comprises an input RS485 interface.

3. The apparatus recited in claim 1 wherein the engine communication interface comprises an input RS232 interface.

4. The apparatus recited in claim 1 wherein the engine communication interface comprises controller area network (CAN) bus interface.

5. The apparatus recited in claim 1 wherein the engine communication interface comprises discrete wiring to alarm relays of the engine controller.

6. The apparatus recited in claim 1 wherein the remote database comprises a remote web-accessible database that provides for remote access to real-time engine data by way of a web browser.

7. The apparatus recited in claim 1 wherein the network connection comprises a wireless connection.

8. The apparatus recited in claim 1 wherein the processor implements an algorithm that:
polls the engine controller for status and activates the display in response to the status reported by the engine controller;
polls the engine controller for engine operational parameter values; and
transmits the engine controller values and status to the remote database at predetermined times or if values or status have changed.

9. The apparatus recited in claim 8 wherein the algorithm:
checks for inbound commands received from the remote database via the Internet connection input by a remote user;
if commands are received, transmits the commands by way of the engine communication interface to the engine controller; and
transmits results of the commands to the remote database.

10. Apparatus comprising:
a stationary power generator having an engine controller for supplying emergency power to a substantially-colocated facility;
a remote annunciator that is remotely-located from the engine controller and located within the facility that comprises:
a display including one or more audible and visual engine status indicators for indicating status reported by the engine controller;
interface electronics for causing the display to indicate status reported by the engine controller;

an engine communication interface for communicating with the engine controller;

an Internet connection;

a computer processor coupled to the interface electronics, the engine communication interface and the Internet connection, for polling the engine controller to monitor engine parameters and conditions reported by the engine controller, and for automatically reporting engine parameters by transmitting the engine parameters and conditions to a remote database by way of the Internet connection.

11. The apparatus recited in claim 10 wherein the interface comprises an input RS485 interface.

12. The apparatus recited in claim 10 wherein the interface comprises an input RS232 interface.

13. The apparatus recited in claim 10 wherein the engine communication interface comprises controller area network (CAN) bus interface.

14. The apparatus recited in claim 10 wherein the engine communication interface comprises discrete wiring.

15. The apparatus recited in claim 10 wherein the remote database comprises a remote web-accessible database that provides for remote access to real-time engine data by way of a web browser.

16. The apparatus recited in claim 10 wherein the network connection comprises a wireless connection.

17. The apparatus recited in claim 10 wherein the processor implements an algorithm that:
- polls the engine controller for status and activates the display in response to the status reported by the engine controller;
- polls the engine controller for engine operational parameter values; and
- transmits the engine controller values and status to the remote database at predetermined times or if values or status have changed.

18. The apparatus recited in claim 17 wherein the algorithm:
- checks for inbound commands received from the remote database via the Internet connection input by a remote user;
- if commands are received, transmits the commands by way of the engine communication interface to the engine controller; and
- transmits results of the commands to the remote database.

19. A method for use with a stationary engine and engine controller, comprising:
- providing a remote annunciator that is remotely located from the stationary engine, that is disposed in a facility near the stationary engine, that is coupled to the stationary engine controller, and that comprises a display including one or more audible and visual engine status indicators, interface electronics for causing the display to indicate status reported by the engine controller, an engine communication interface for communicating with the engine controller, an Internet interface, and a computer processor coupled to the interface electronics, the engine communication interface and the Internet interface;
- polling the engine controller to monitor engine parameters and the status reported by the engine controller, and
- automatically reporting engine parameters by transmitting the engine parameters and status to a remote web-accessible database by way of the Internet interface.

20. The method recited in claim 19 further comprising connecting a plurality of stationary engines that each comprise a stationary engine controller to the remote annunciator and communicating with a remote monitoring and control system comprising the remote database by way of the remote annunciator, to permit remote control of the engines.

* * * * *